United States Patent
Gaur et al.

(10) Patent No.: US 8,468,337 B2
(45) Date of Patent: Jun. 18, 2013

(54) SECURE DATA TRANSFER OVER A NETWORK

(75) Inventors: Santosh P. Gaur, Raleigh, NC (US); William Eric Hall, Clinton, CT (US)

(73) Assignee: International Business Machines Corporation, Armonk, NY (US)

(*) Notice: Subject to any disclaimer, the term of this patent is extended or adjusted under 35 U.S.C. 154(b) by 2251 days.

(21) Appl. No.: 10/790,966

(22) Filed: Mar. 2, 2004

(65) Prior Publication Data

US 2005/0198492 A1    Sep. 8, 2005

(51) Int. Cl.
H04L 29/06    (2006.01)

(52) U.S. Cl.
USPC .......................................................... 713/153

(58) Field of Classification Search
USPC .......................................................... 713/153
See application file for complete search history.

(56) References Cited

U.S. PATENT DOCUMENTS

| | | | |
|---|---|---|---|
| 4,627,018 A * | 12/1986 | Trost et al. ..................... 711/149 |
| 4,817,140 A | 3/1989 | Chandra et al. |
| 5,088,033 A | 2/1992 | Binkley et al. |
| 5,235,641 A * | 8/1993 | Nozawa et al. ............... 713/193 |
| 5,247,577 A | 9/1993 | Bailey et al. |
| 5,357,276 A * | 10/1994 | Banker et al. ................. 725/102 |
| 5,430,850 A | 7/1995 | Papadopoulos et al. |
| 5,430,874 A | 7/1995 | Kumazaki et al. |
| 5,432,848 A | 7/1995 | Butter et al. |
| 5,446,906 A | 8/1995 | Kardach et al. |
| 5,619,660 A | 4/1997 | Scheer et al. |
| 5,663,896 A | 9/1997 | Aucsmith |
| 5,699,460 A | 12/1997 | Kopet et al. |
| 5,712,800 A | 1/1998 | Aucsmith |
| 5,719,436 A | 2/1998 | Kuhn |
| 5,724,027 A | 3/1998 | Shipman et al. |
| 5,757,919 A | 5/1998 | Herbert et al. |
| 5,793,101 A | 8/1998 | Kuhn |

(Continued)

FOREIGN PATENT DOCUMENTS

| | | |
|---|---|---|
| EP | 0 893 751 | 1/1999 |
| JP | 09171500 | 6/1997 |
| WO | 99/14881 | 2/1999 |

OTHER PUBLICATIONS

Allen Jr., J.R., et al., IBM PowerNP Network Processor: Hardware, software, and application, IBM Journal of Research & Development, Mar./May 2003, pp. 177-193, vol. 47, No. 2-3, IBM, USA.

(Continued)

*Primary Examiner* — Cordelia Zecher
(74) *Attorney, Agent, or Firm* — Patrick J. Daugherty; Driggs, Hogg, Daugherty & Del Zoppo Co., LPA

(57) ABSTRACT

A system and method are described for secure data transfer over a network. According to an exemplary embodiment a system for secure data transfer over a network includes memory and a memory controller configured to transfer data received from the network to the memory. The system includes a processor, having logic configured to retrieve a portion of the data from the memory using the memory controller. The processor also includes logic configured to perform security operations on the retrieved portion of the data, and logic configured to store the operated-on portion of the data in the memory using the memory controller. The memory controller is further configured to transfer the operated-on portion of the data from the memory to the network.

21 Claims, 7 Drawing Sheets

CRYPTO CO-PROCESSOR BLOCK

U.S. PATENT DOCUMENTS

| | | | |
|---|---|---|---|
| 5,818,939 | A | 10/1998 | Davis |
| 5,822,255 | A | 10/1998 | Uchida |
| 5,844,986 | A | 12/1998 | Davis |
| 5,892,899 | A | 4/1999 | Aucsmith et al. |
| 5,930,483 | A | 7/1999 | Cummings et al. |
| 5,937,063 | A | 8/1999 | Davis |
| 5,940,591 | A | 8/1999 | Boyle et al. |
| 5,941,987 | A | 8/1999 | Davis |
| 5,949,881 | A | 9/1999 | Davis |
| 5,968,176 | A | 10/1999 | Nessett et al. |
| 5,991,797 | A | 11/1999 | Futral et al. |
| 6,006,330 | A | 12/1999 | Soni |
| 6,009,527 | A | 12/1999 | Traw et al. |
| 6,011,910 | A | 1/2000 | Chau et al. |
| 6,014,729 | A | 1/2000 | Lannan et al. |
| 6,018,767 | A | 1/2000 | Fijolek et al. |
| 6,021,201 | A | 2/2000 | Bakkle et al. |
| 6,026,085 | A | 2/2000 | Chau et al. |
| 6,038,320 | A | 3/2000 | Miller |
| 6,047,375 | A | 4/2000 | Easter et al. |
| 2002/0099855 | A1 | 7/2002 | Bass et al. |
| 2002/0188839 | A1* | 12/2002 | Noehring et al. ............ 713/153 |
| 2002/0188871 | A1* | 12/2002 | Noehring et al. ............ 713/201 |
| 2003/0069973 | A1* | 4/2003 | Ganesan et al. ............ 709/226 |
| 2004/0030513 | A1* | 2/2004 | Kocaman et al. ............ 702/79 |

OTHER PUBLICATIONS

Amerijcicx C., et al., Architecture of a reconfigurable system based on an embedded FPPA, Proceedings of the SPIE—The International Society for Optical Engineering, 1998, pp. 141-149, vol. 3526, SPIE—Int. Soc. Opt. Eng, USA.

Bleakley C., et al., FILU-200 DSP coprocessor IP core, Conference Record of the Thirty-Third Asilomar Conference on Signals, Systems, and Computers (Cat. No. CH37020), 1999, pp. 757-761, vol. 1, IEEE, Piscataway, NJ, USA.

Claesen L., et al., Subterranean: A 600 Mbit/sec cryptographic VLSI chip, Proceedings 1993 IEEE International Conference on Computer Design: VLSI in Computers and Processors (Cat. No. 93CH3335-7), 1993, pp. 610-613, IEEE Computer Soc. Press, Los Alamitos, CA, USA.

Daemen, J., et al., A Cryptographic Chip for ISDN and high speed multi-media applications, VLSI Signal Processing, VI (Cat. No. 93TH0533-0), 1993, pp. 12-20, IEEE, New York, NY, USA.

Easter, RJ, et al., S/390 Enterprise Server CMOS cryptographic coprocessor, IBM Journal of Research and Development, Sep.-Nov. 1999, pp. 761-776, vol. 43, No. 5-6, IBM, USA.

Gay C., Memory supervision with the M68000 processor. II. Realisation with the PMMU component, Elektronik, Jun. 12, 1987, pp. 94-96, 98, vol. 36, No. 12, West Germany.

Gordon, Davis et al, U.S. Appl. No. 09/542,189, Network Processor with Multiple Instruction Threads, filed Apr. 4, 2000.

Hermann K., et al., A programmable processing element dedicated as building block for a large area integrated multiprocessor system, 1996 proceedings. Eighth Annual IEEE International Conference on Innovative Systems in Silicon (Cat. No. 96CH35996), 1996, pp. 98-103, IEEE, USA.

Iyer, P., Intel Architecture Labs—Scalable Deployment of Ipsec in Corporate Intranets, Intel Arechitecture Labs Internet Building Blocks Initiative 2000, pp. 1-16.

Kondo T., et al., Single-board SIMD processors using gate-array LSIs for parallel processing, IEICE Transactions on Electronics, Dec. 1993, pp. 1827-1834, vol. E76-C, No. 12, Japan.

Leiserson, CE, et al., Communication-efficient parallel algorithms for distributed random-access machines, Algorithmica, 1988, pp. 53-77, vol. 3, No. 1, West Germany.

Lemme, H., Are Chip Cards secure? Elektronik, Aug. 1998, pp. 44-50, vol. 47, No. 16, WEKA—Fachzeitschriften, Germany.

Mandl C., et al., Real-time search-processor architectures, Elektrotechnik und Informationstechnik, 1998, pp. 137-143, vol. 115, No. 3, Springer-Verlag, Austria.

McCauley, D.E., Shared Memory Model for a Dual-Processor File Server, IBM Technical Disclosure Bulletin, vol. 34, No. 9, Feb. 1992 pp. 336-337.

Melear C, Floating point techniques using MC88000, WESCON/90 Conference Record, 1990, pp. 197-204, Los Angeles, CA, USA.

Royo, A., et al., Design and implementation of a coprocessor for cryptography applications, Proceedings, European Design and Test Conference. ED & TC 97 (Cat. No. 97TB100102), pp. 213-217, IEEE Computer Soc. Press, Los Alamitos, CA, USA.

Sang Won Lee, et al., RAPTOR: a single chip multiprocessor, AP-ASIC'99. First IEEE Asia Pacific Conference on ASICs (Cat. No. 99EX360), 1999, pp. 217-220, IEEE, Piscataway, NJ, USA.

Yeong Kang Lai, An efficient array architecture with data-rings for 3-stephierarchical search block matching algorithm, Proceedings of 1997 IEEE International Symposium on Circuits and Systems. Circuits and Systems in the Information Age. ISCAS '97 (Cat. No. 97CH35987), 1997, pp. 1361-1364, vol. 2, IEEE, New York, NY, USA.

High Speed Serial Interface Micro Channel Adapter, IBM TDB, vol. 34, No. 7A, Dec. 1991, pp. 299-301.

Developing Embedded System Control Programs, IBM TDB, vol. 39, No. 10, Oct. 1996, pp. 151-152.

Task Switching Between Processing Using the Sequencer, IBM TDB, vol. 35, No. 7, Dec. 1992, pp. 362-363.

HIPP III 8300 FlowThrough Security Processor, Hifn Intelligent Secure Netorking.

\* cited by examiner

SECURE DATA TRANSFER OVER A NETWORK

RELATED APPLICATIONS

This application is related to and shares a common disclosure with commonly-assigned copending applications U.S. application Ser. No. 10/791,415, titled "System and Method for Performing Security Operations on Network Data" and U.S. application Ser. No. 10/791,239, titled "System and Method for Performing Cryptographic Operations on Network Data", both filed on Mar. 2, 2004, the entire contents of which are incorporated herein by reference.

BACKGROUND

Today, most data transfers sent over the public networks, such as the Internet, are left unprotected against attacks. Even users of private networks that rely on public network communication facilities to connect end-user terminals and workstations in the private network to servers and other terminals in the public network are vulnerable to attacks. Moreover, recent industry studies have found that over half of all private network security breaches originated from within the private network. The situation results mainly because popular packet communication protocols, such as TCP/IP, do not have protection mechanisms designed into their protocol stacks. Consequently, any terminal connected to a TCP/IP network can intercept, replay, or produce IP packets sent over the network.

In response to the situation, the Internet Engineering Task Force (or IETF) defined Internet Protocol Security (or IPSec) to provide encryption-based security in TCP/IP networks. IPSec is a network-layer (e.g., the IP layer of TCP/IP) security framework that provides end-to-end network security services such as authentication, data integrity, confidentiality (or encryption), and anti-replay protection for IPv4 and IPv6 data sent over public and private networks. IPSec is defined in several IETF publications, including RFC 2401, titled "Security Architecture for the Internet Protocol", and RFC 2411, titled "IP Security Document Roadmap".

The first IPSec solutions were implemented primarily using software. While these solutions provided acceptable performance at the time of their introduction, software implementations of IPSec can no longer keep pace with the rapidly improving bandwidth of today's workstations, servers, and routers. Some hardware-assisted IPSec solutions have been introduced that provide improved performance over prior software implementations, but these systems still do not deliver the high-bandwidth performance needed to support today's communication systems. Moreover, these early hardware-assisted IPSec solutions generally employ pipelined, flow-through processor architectures, the performance of which can be impacted by "bursty" traffic flows.

In addition, many IPSec solutions focus on performing security operations, such as encryption and authentication, and either ignore or place a lesser emphasis on higher workload functions such as compression and quality-of-service concerns, including flow policy, congestion control, and traffic shaping.

SUMMARY

Accordingly, a system and method are disclosed for secure data transfer over a network. According to an exemplary embodiment a system for secure data transfer over a network includes memory and a memory controller configured to transfer data received from the network to the memory. The system includes a processor, having logic configured to retrieve a portion of the data from the memory using the memory controller. The processor also includes logic configured to perform security operations on the retrieved portion of the data, and logic configured to store the operated-on portion of the data in the memory using the memory controller. The memory controller is further configured to transfer the operated-on portion of the data from the memory to the network.

According to another exemplary embodiment, a method for secure data transfer over a network is disclosed that includes transferring data from the network to memory using a memory controller. A portion of the data is retrieved from the memory into a processor using the memory controller. Security operations are performed on the retrieved portion of the data using the processor. The operated-on portion of the data is stored in the memory and transferred m the memory to the network using the memory controller using the memory controller.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

Various aspects will now be described in connection with exemplary embodiments, including certain aspects described in terms of sequences of actions that can be performed by elements of a computer system. For example, it will be recognized that in each of the embodiments, the various actions can be performed by specialized circuits or circuitry (e.g., discrete and/or integrated logic gates interconnected to perform a specialized function), by program instructions being executed by one or more processors, or by a combination of both.

Thus, the various aspects can be embodied in many different forms, and all such forms are contemplated to be within the scope of what is described. For each of the various aspects, any such form of embodiment can be referred to here as "logic configured to" perform, or "logic that" performs a described action.

Figure 1:
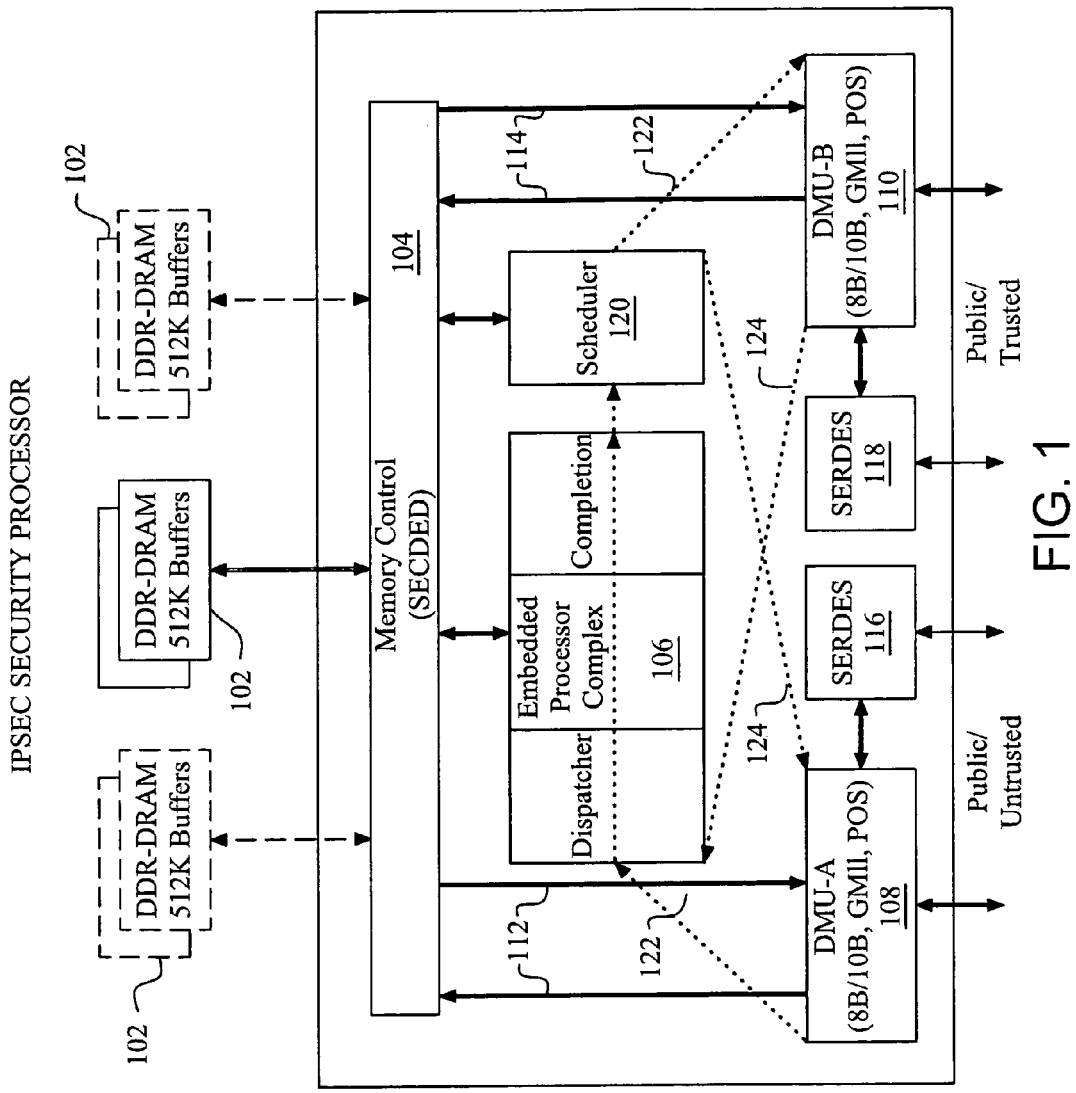
FIG. 1 illustrates a system for secure data transfer over a network, according to an exemplary embodiment.

A system for secure data transfer over a network according to an exemplary embodiment is shown in FIG. 1. The system shown can be described as a "store-and-forward" system in contrast to a "flow-through" system. In a store-and-forward system, received data, such as a data packet, is first stored in memory, after which the data is operated on by task-specific processors. When processing is complete, the data is forwarded from the memory to its destination. In a flow-through system, the received data is passed (or flows) through a series of task-specific processors that operate on the data as it flows through the system. In a flow-through system, portions of the received data, e.g., the packet header, can be operated-on and transmitted to its destination before remaining portions of the data, e.g., the packet payload, has been operated-on or even received. The processors in flow-through systems typically operate in a pipelined manner.

The system of FIG. 1 includes memory 102, such as the Double Data Rate (DDR) Dynamic Random Access Memory (DRAM), or DDR-DRAM, shown in the figure. Any type of large, high-density, high-latency storage can be used as the memory 102. The memory 102 is preferably homogenous, e.g., of a same type, to simplify memory allocation during the various tasks performed by the system. The memory 102 can be allocated in blocks, e.g., of 512 K buffers, each of which blocks can be partitioned into a number of memory banks (not shown).

The system of FIG. 1 includes a memory controller 104 configured to transfer data received from the network (not shown) to the memory 102. The memory controller 104 can include logic configured to dynamically allocate additional memory blocks 102 depending on the system load. For example, additional memory blocks 102 can be dynamically added when the data (or traffic) being processed by the system peaks, or becomes "bursty". An advantage of store-and-forward systems, such as that shown in FIG. 1, is that the overall performance (or throughput) of the system can be maintained under "bursty" conditions by dynamically adding memory to store the additional traffic data. Although the latency through the system can be impacted, the system's performance under "bursty" conditions can outperform comparable flow-through systems.

According to an exemplary embodiment, the memory controller 104 can include logic configured to reference the number of memory banks in a sequence that minimizes a memory access time. The memory controller 104 can also include logic configured to include a request to reference the memory into one of a group of read requests and a group of write requests. Additional logic in the controller 104 can be configured to execute all requests included in one of the groups of read requests and write requests before executing a request included in the other group. These functions of the memory controller 104 are enhanced through the use of a common, homogeneous memory, such as the DDR-DRAM 102 shown in FIG. 1. This can lead to reduced memory access times and more efficient memory allocation than can be possible in systems that use various task-specific memories, such as Contents Addressable Memories (CAMs) and internal Static RAMs (or SRAMs). Additional logic can be configured in the system, e.g. in the controller 104, to include error correction code with the data transferred to or stored in the memory 102. Logic can also be included to detect and correct errors in the data retrieved or transferred from the memory based on the error correction code included with the data.

The system of FIG. 1 also includes a processor, such as the Embedded Processor Complex (EPC) 106 shown in the figure. EPC, as used here, denotes a processing structure having multiple processors, e.g., protocol processors, together with dedicated hardware-assist coprocessors, for performing various tasks. The protocol processors can be "pico-processors" capable of executing a limited set of instructions. As will be understood by those skilled in the art, the term "pico-processor" is used here to denote a processor having an instruction set that is somewhat more limited than that of a typical Reduced Instruction Set Computer (or RISC processor). Although, an EPC is illustrated and described as the processor 106 in FIG. 1, other types of processing structures can be used without deviating greatly from what is described below.

The processor 106 includes logic configured to retrieve a portion of the data from the memory 102 using the memory controller 104. As discussed above, the processing system shown in FIG. 1 is a store-and-forward system. Accordingly, after the data is transferred from the network (not shown) to the memory (e.g., the "store" step), the data is moved to the EPC 106 via the memory controller 104 for processing. The processor 106 also includes logic configured to perform security operations on the retrieved portion of the data. For example, the processor 106 can include logic configured to execute programmable instructions (e.g., pico-code) for implementing IPSec. As discussed above, IPSec can provide end-to-end security services such as authentication, data integrity, confidentiality (or encryption), and anti-replay protection for IPv4 and IPv6 data over public and private networks.

To provide encryption services, the logic configured to perform security operations can include both logic configured to obscure the portion of the data when the retrieved portion is non-secure data, and logic configured to decipher the portion of the data when the retrieved portion is secure data. As used here, non-secure data can include unencrypted (or clear text) data exchanged within a private or trusted network, and secure data can include encrypted data exchanged within a public or untrusted network.

The logic configured to obscure and decipher the portion of data can include pico-code to implement IP Encapsulating Security Payload (ESP). ESP is described in detail in RFC 2406 published by the IETF. In addition, the logic can be configured to perform any of several industry-standard cryptographic algorithms for bulk encryption supported by ESP, including the Data Encryption Standard (DES), the Triple-DES (3DES), and the Advanced Encryption Standard (AES) algorithms. These algorithms are discussed in greater detail below in conjunction with the exemplary cryptographic coprocessor shown in FIG. 6.

To provide authentication services, the logic configured to perform security operations can include logic configured to determine an integrity of the portion of data. The logic configured to determine an integrity of the portion of data can include pico-code to implement IP Authentication Header (or AH), as described in detail in IETF publication RFC 2402, and pico-code to implement ESP authentication.

The logic can also be configured to perform any of the several industry-standard hashing algorithms, such as Secure Hash Algorithm (SHA-1) and Message Data 5 (MD5), each compatible with AH and ESP. The hashing algorithms can be used to determine a message authentication code (MAC) associated with the portion of the data. The MAC can then be compared with an expected value to determine the integrity of the portion of the data. The hashing algorithms described above are discussed in greater detail below in conjunction with the exemplary cryptographic coprocessor shown in FIG. 6.

The processor 106 also includes logic configured to store the operated-on portion of the data in the memory using the memory controller 104. As used here, the "operated-on" portion refers to the portion of data after the security operations have been performed. The memory controller 104 is further configured to transfer the operated-on portion of the data from the memory 102 to the network (not shown). Accordingly, with the store-and-forward arrangement shown in FIG. 1, data is stored into the memory 102, operated on by the EPC 106, returned to the memory 102 after being operated-on by the EPC 106, and then the operated-on portion is forwarded from the memory 102 to the network (not shown) where it is routed to its destination node.

To aid in the transfer of data to and from the network, the system of FIG. 1 can include a network interface coupled to the memory controller 104. The network interface can include a first data moving unit (DMU) 108 configured to exchange e.g., via the data buses 112. secure data with a first portion of the network (not shown). The first network portion can be a public or untrusted portion of the network, such as the Internet. The network interface can also include a second DMU 110 configured to exchange, e.g., via the data buses 114. non-secure data with a second portion of the network (not shown). The second network portion can be a private or trusted portion of the network, such as a corporate Intranet.

The arrangement described above can be used to perform security operations on data received by the first DMU 108 from the first portion of the network, and to forward the operated-on data to the second portion of the network via the second DMU 110. The dotted arrows 122 shown in FIG. 1 depict a logical path of the data through the system under this mode of operation. The arrangement described above can also be used to perform security operations on data received by the second DMU 110 from the second portion of the network, and to forward the operated-on data to the first portion of the network via the first DMU 108. The dotted arrows 124 shown in FIG. 1 depict a logical path of the data through the system in this mode of operation. As will be understood by those skilled in the art, the system of FIG. 1 can be further configured, such that data received from the network portion coupled to one of the DMUs 108, 110, can be operated on, and then forwarded to the same network portion using the one DMU 108, 110. A combination of the dotted arrows 122, 124 depicts the possible logical paths of the data through the system under these modes of operation.

Each DMU 108, 110, can be configured for both Ethernet and POS transmission, and can be capable of moving data at 1 Gb/s when receiving and transmitting data in either modes. When configured for Ethernet, each DMU 108, 110 can support either one port of 1 Gigabit Ethernet or ten ports of Fast Ethernet (e.g., at 10/100 Mb/s). To support 1 Gigabit Ethernet, each DMU 108, 110 can be configured as either a gigabit media-independent interface (GMII) or a ten-bit interface (TBI). To support Fast Ethernet, each DMU 108 110 can be configured as a serial media-independent interface (SMII) supporting ten Ethernet ports. When configured for POS mode, each DMU 108, 110 can support both clear-channel and channelized optical carrier (OC) interfaces.

The network interface can also include a first serializer/deserializer (SERDES) circuit 116 coupled between the first DMU 108 and the first network portion (not shown), and a second SERDES 118 coupled between the second DMU 110 and the second network portion (not shown). Each SERDES can be configured to convert serial data received from the respective network portions to a parallel format, and to convert parallel data received from the respective DMUs to a serial format. The design of such SERDES circuitry, which is known to those skilled in the art, is beyond the scope of this document and will not be discussed in detail.

According to an exemplary embodiment, the processor 106 can include logic configured to perform quality-of-service (QoS) operations on the data in coordination with performing the security operations. QoS operations can provide improved service to selected network traffic over various technologies, such as over IP-routed Ethernet networks. A goal of QoS is to provide priority including dedicated bandwidth, controlled jitter and latency (required by some real-time and interactive traffic), and improved loss characteristics the selected network traffic.

The logic configured to perform QoS operations can include logic configured to identify an information flow associated with the portion of the data. An information flow can be defined by combination of source and destination network addresses, a combination of source and destination network socket numbers, by a session identifier, or as any portion of data (e.g., or packet) from a certain application or from an incoming interface in the network. The logic configured to identify an information flow can include pico-code to implement Differentiated Services (Diffserv), as described in detail in IETF publications RFC 2474 and 2475. For example, the portion of the data can be marked by setting bits in an IP header field (e.g., the DS Field) of an IPv4 or IPv6 packet to identify the information flow associated with the portion. Alternatively, an information flow associated with portion of the data can be identified on a "per-hop basis", e.g., based on a device in the network that the portion of data is being carried on.

Once a flow is identified, logic can be configured in the processor 106 to determine a priority of the information flow. Additional logic in the processor 106 can be configured to schedule at least one of the retrieving the portion of the data and the transferring the operated-on portion of the data from memory 102 based on the priority of the information flow associated with the portion of the data. For example, portions of the data associated with a higher priority information flow can be retrieved from the memory 102 and operated on by the EPC 106 before portions having a lower priority are operated on.

In addition, the operated-on portions of the data associated with a higher priority information flow can be transferred from the memory 102 to the network before transferring out of the memory 102 portions of the data associated with a lower priority flow. In this way, QoS policies associated with the data operated on by the EPC 106 can be enforced. For example, the scheduler 120 shown in FIG. 1 can be used to enforce QoS policies by scheduling the transfer of data from the memory 102 to the network via the memory controller 104. The scheduler 120 can also be used for traffic shaping (e.g., queuing)) and policing (e.g., discarding) portions of data associated with a particular information flow.

Logic in the processor 106 can be configured to decipher the portion of the data prior to the identifying of the information flow when the retrieved portion is secure data (e.g., encrypted). Likewise, the logic can be configured to obscure the portion of the data after the identifying of the information flow when the retrieved portion is non-secure data (e.g., unencrypted). Coordinating the performing of the QoS and security operations in this manner can vastly improve the QoS of traffic operated on by the security processor 106 by enforcing QoS policies that can not be enforced on encrypted data.

According to an exemplary embodiment, the processor 106 can also include logic configured to compress the portion of the data using the processor prior to performing the security operations when the retrieved portion is non-secure data, and logic configured to decompress the portion of the data in the processor after performing the security operations when the retrieved portion is secure data. For example, the processor 106 can include pico-code to implement IP Payload Compression (IPComp) as described in detail in IETF publication RFC 2393.

IPComp is a protocol that can reduce the size of IP datagrams, and can be particularly useful when encryption is applied to the IP datagrams. Encrypting the IP datagram can causes the data to be random in nature, rendering compression at lower protocol layers (e.g., PPP Compression Control Protocol [RFC-1962]) ineffective. If both compression and encryption are required, compression must be applied before encryption, and decompression applied after decryption. The processor 106 can also include additional logic configured to implement at least one of a Lempel-Ziv-Stac (LZS) and an Adaptive Lossless Data Compression (ALDC) compression algorithm. The LZS compression algorithm is described in detail in IETF publication RFC 2395. ALDC is described in Standard QIC-154, Revision A, Mar. 10, 1994, and in ECMA-222, ISO/IEC 15200, and ANSI x3.280-1996. Both the LZS and ALDC compression algorithms can be applied to provide lossless compression to the payloads of IP datagrams including, but not limited to, those that adhere to the IPComp protocol.

Figure 2:
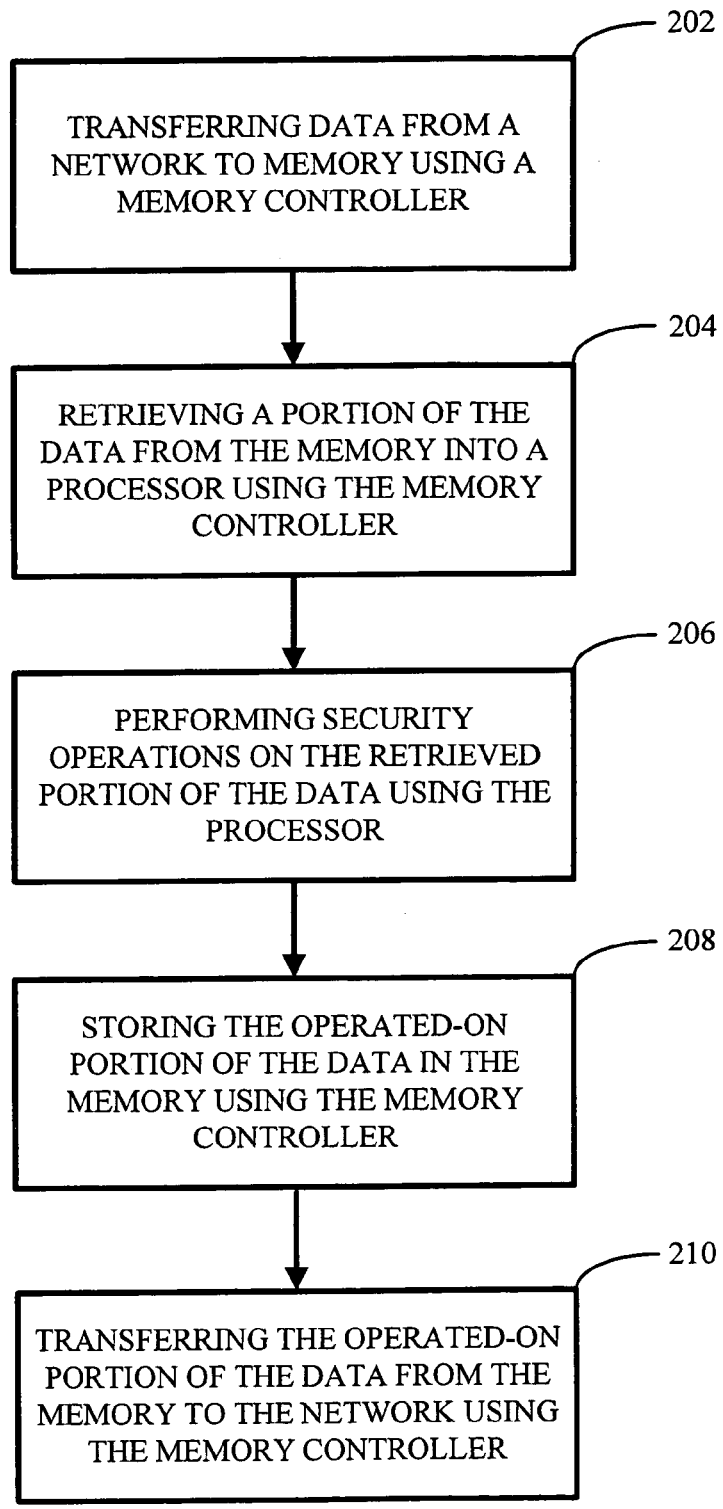
FIG. 2 is a flowchart illustrating a method for secure data transfer over a network using the system shown in FIG. 1, according to an exemplary embodiment.

FIG. 2 is a flowchart illustrating a method for secure data transfer over a network. The method can be carried out using a store-and-forward arrangement such as that shown in FIG. 1. In block 202, data from the network is transferred to memory, e.g., DDR-DRAM 102, using a memory controller, such as memory controller 104. In block 204, a portion of the data is retrieved from the memory 102 into a processor, such as the EPC 106, using the memory controller 104. In block 206, security operations are performed on the retrieved portion of the data using the processor 106. The security operations can include IPSec authentication, data integrity, confidentiality (or encryption), and anti-replay protection, as described above in conjunction with the arrangement of FIG. 1. Next, in block 208, the operated-on portion of the data is stored in the memory 102 using the memory controller 104. Finally, in block 210, the operated-on portion of the data is transferred from the memory 102 to the network using the memory controller.

According to an exemplary embodiment, the security operations can include at least one of obscuring the portion of the data when the retrieved portion is non-secure data; deciphering the portion of the data when the retrieved portion is secure data; and determining an integrity of the portion of data. Algorithms for encryption and authentication for use with IPSec are discussed above, and are described below in detail in conjunction with the cryptographic processor shown in FIG. 6.

In addition, QoS operations can be performed on the data in coordination with performing the security operations using the processor 106. As discussed above, the QoS operations can include identifying an information flow associated with the portion of the data; determining a priority of the information flow; and scheduling at least one of the retrieving the portion of the data and the transferring the operated-on portion of the data from memory based on the priority of the information flow associated with the portion of the data. The QoS and security operations can be coordinated, such that the portion of the data deciphered prior to the identifying of the information flow when the retrieved portion is secure data, and the portion obscured after the identifying of the information flow when the retrieved portion is non-secure data. Additional shaping (queuing) and policing (discarding) of portions of the data associated with a particular information can performed.

According to an exemplary embodiment, the portion of the data can be compressed using the processor 106 prior to performing the security operations when the retrieved portion is non-secure data, and the portion can be decompressed in the processor 106 after performing the security operations when the retrieved portion is secure data. For example, the IPComp protocol and/or at least one of the LZS and ALDC compression algorithms can be applied to provide lossless compression of IP datagrams as discussed above.

According to yet another exemplary embodiment, a request to reference the memory can be included into one of a group of read requests and a group of write requests. All pending requests included in one of the groups of read requests and write requests can be executed before executing the requests included in the other group. Persons skilled in the art will understand that grouping read/write requests can provide for efficient memory access by reducing bus set-up and reconfiguration times.

In a related embodiment, the executing of all requests included in one of the groups of read requests and write requests can occur when a sum of the requests included in one of the groups corresponds to a predetermined amount of the memory. The predetermined amount can correspond to an amount of the memory 102 (e.g., an optimal number of memory banks) that maximizes memory throughput. In addition, portions of the memory 102 (e.g., a number of memory banks) can be referencing in a sequence that minimizes a memory access time. Finally, error correction code can be included with the data transferred to or stored in the memory 102 to detect and possibly correct errors in the data retrieved or transferred from the memory 102.

The instructions of a computer program as illustrated in FIG. 2 for secure data transfer over a network can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used here, a "computer readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

Figure 3:
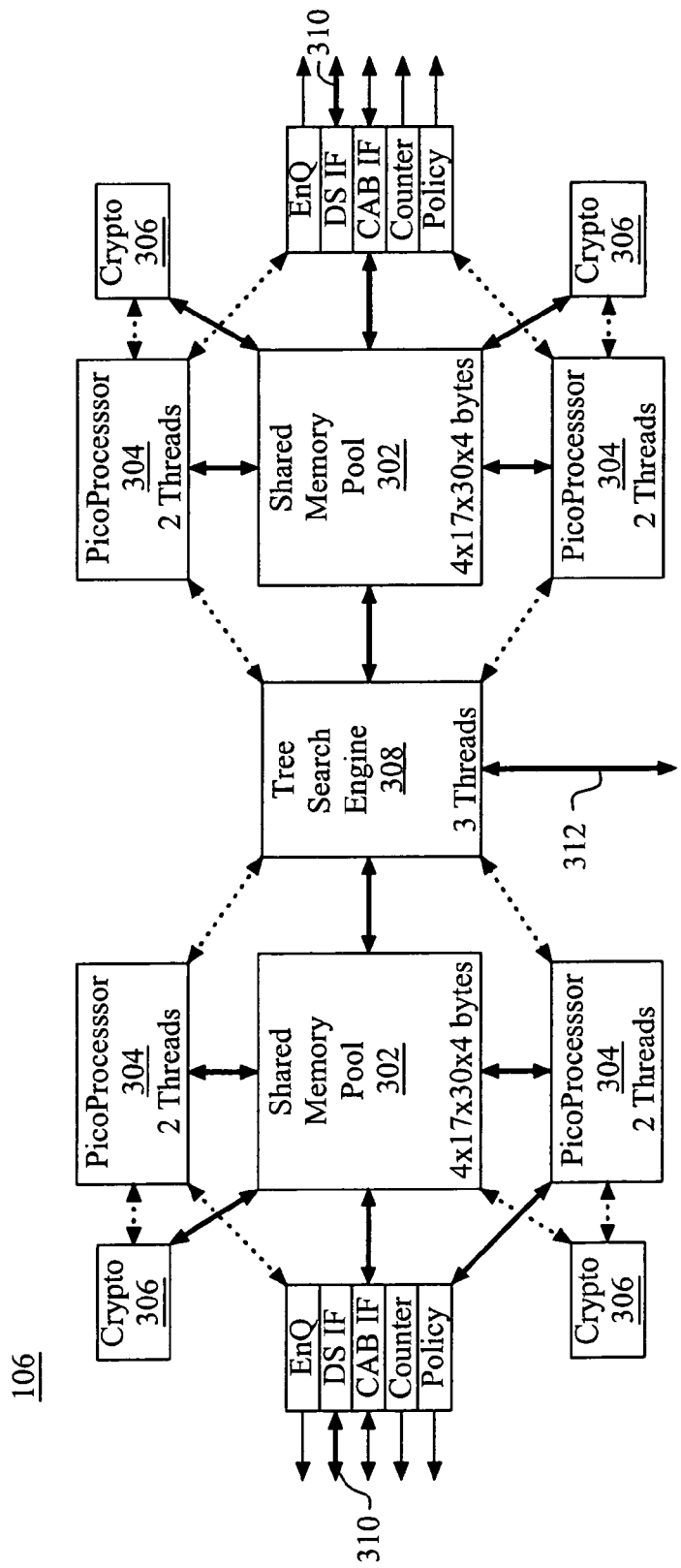
FIG. 3 illustrates a system for performing security operations on network data, according to an exemplary embodiment.

A system for performing security operations on network data according to an exemplary embodiment is shown in FIG. 3. The system shown in FIG. 3 corresponds to the EPC 106 shown in FIG. 1. The system includes multiple processors, e.g., protocol processors 304, together with dedicated hardware-assist coprocessors, e.g., crypto coprocessors 306, for performing various tasks. The term coprocessor is used here to describe a processor configured to assist another processor in a particular task. A coprocessor need not be of lesser complexity or different in any other way to its corresponding processor, although often coprocessors can include hardware specially designed to optimally perform a given task. In contrast, a processor can be more general-purpose in design than its coprocessor, and can be configured to perform tasks defined by executable instructions, such as pico-code.

The system shown in FIG. 3 includes memory, such as the shared memory pool 302 shown in the figure. The shared memory pool can comprise SRAM embedded with the logic of EPC 106, although other types of memory can be used. The system also includes a data coprocessor (e.g., the data store interface, or DS IF) configured to transfer data into and out of the memory 302, e.g., to the DDR-DRAM 102 of FIG. 1 via bus 310.

As briefly discussed above, the system includes a plurality of processors 304 coupled to the memory 302 and to the data coprocessor DS IF. Each processor 304 can be configured to perform, in parallel to one another, security operations on a portion of the data. The processors 304 can be pico-processors capable of executing a limited set of instructions for implementing a various number of security-related protocols, such as IPSec, IPComp, DiffServ, and the like. The system also includes a plurality of security coprocessors (e.g., cryptographic, or crypto coprocessors) 306 coupled to the memory 302. Each security coprocessor 306 is coupled to a respective one of the processors 304, and is configured to assist the respective processor 304 in performing security operations on the portion of the data.

Figure 4:
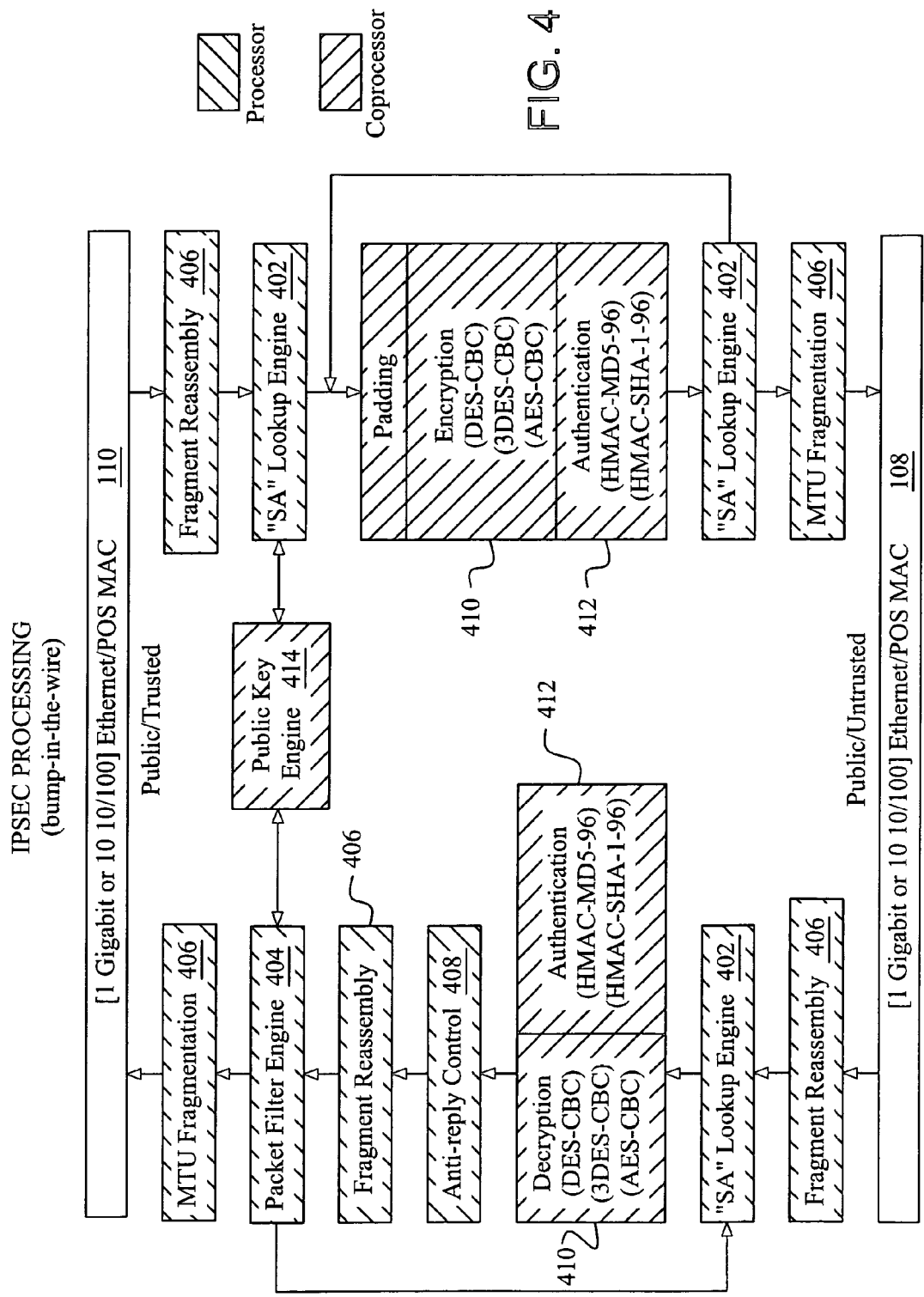
FIG. 4 illustrates an IPSec process for performing security operations using the system of FIG. 3, according to an exemplary embodiment.

FIG. 4 illustrates an IPSec process for performing security operations using the system of FIG. 3, according to an exemplary embodiment. The IPSec process is referred to as a "bump-in-the-wire" (BITW) implementation. The BITW process can be implemented in a security processor gateway node arranged between two networks to provide security operations on data passed between the networks. The figure also depicts an exemplary apportionment of tasks between the processors 304 and the security coprocessors 306 in performing the security operations.

For example, FIG. 4 shows that each of the plurality of processors 304 can include logic configured to identify a security association related to the portion of the data, such as "SA" Lookup Engine pico-code 402 shown in the figure. A security association (or SA) can be an instance of security policy and keying material applied to the data included in an information flow. IPSec SAs are unidirectional and they are unique in each security protocol, e.g., ESP and AH. A set of SAs are needed for a protected data pipe, one per direction per protocol. For example, if you have a pipe that supports ESP between peers, one ESP SA is required for each direction. SAs can be uniquely identified by destination (IPSec endpoint) address, security protocol (AH or ESP), and a security parameter index (SPI), used to distinguish between SAs having a same endpoint address and protocol. Information regarding SAs can be found in IETF publication RFC 2408, titled "Internet Security Association and Key Management Protocol (ISAKMP)".

Each of the plurality of processors 304 can also include logic configured to filter the portion of the data based on the identified SA. For example, the BITW process of FIG. 4 includes Packet Filter Engine pico-code 404. The Packet Filter Engine can be used to discard packets passing between a public/untrusted network and a private/trusted network that lack the necessary security credentials. The processors 304 can also include logic configured to divide the portion of the data into fragments and to reassemble the fragments into the portion. For example, pico-code blocks 406 for performing fragmentation and reassembly of fragments are included in the BITW process as shown in FIG. 4. Fragmentation can be required when the portion of the data exceeds a specified data (or packet) length. As shown in the figure, fragmentation/reassembly of the portion of data should occur after/before the performing of the security operations on the data. Each processor 304 can also include logic configured to identify a sequence associated with the portion of the data. For example, the sequence ID can be used by the Anti-replay Control pico-code 408 to reject or discard replayed packets to provide a form of partial sequence data integrity.

Each security coprocessor 306 can include logic configured to obscure the portion of the data when the portion is non-secure data and logic configured to decipher the portion of the data when the portion is secure data. For example, the security coprocessors 306 can include logic configured to perform encryption/decryption of the portion of the data using one of the DES, 3DES, or AES standard encryption algorithms discussed above. The security coprocessors 306 can also include logic configured to determine an integrity of the portion of the data. For example, the security coprocessors 306 can include logic configured to perform authentication of the portion of the data using one of the SHA-1 or MD5 standard hashing algorithms discussed above.

In addition to the above, each security coprocessor 306 can include logic configured to establish an SA related to the portion of the data. The SA can include information used to obscure and decipher the portion and to determine the integrity of the portion. For example, each security coprocessor 306 can include a Public Key Engine (PKE) 414 that can include logic used to assist in the generation of keying material, e.g., cryptographic keys generated according to the Internet Key Exchange (IKE) hybrid protocol, as defined in IETF publication RFC 2409. The keying material can be used to establish an SA related to the portion of data and to authenticate and encrypt the data, e.g., using AH and ESP. The IKE hybrid protocol uses the Diffie-Hellman method of establishing shared keys over an insecure medium.

The system of FIG. 3 can also include a search engine coprocessor 308 coupled to the memory 302 and to the plurality of processors 304. The search engine coprocessor 308 can be configured to exchange control information between at least one of the memory and external system memory, such as the DDR-DRAM 102 shown in FIG. 1 via bus 312, and each of the plurality of processors 304 for use in performing security operations on the data. The control information can include tables, counters, and other data used by the processors 304 in implementing the various security protocols.

The search engine coprocessor 308 can support various tree search algorithms, including searching Fixed Match Trees (e.g., fixed size patterns requiring an exact match, such as Layer 2 Ethernet media access control tables), Longest Prefix Match Trees (e.g., variable length patterns requiring variable length matches, such as subnet IP forwarding), and Software Managed Trees (e.g., two patterns defining either a range or a bit mask set, such as the masks used for filter rules). The search engine coprocessor 308 can provide for complex searching of the memory 302 and the external memory 102 for control information without having to interrupt execution of the protocol processors 304.

According to an exemplary embodiment, the system of FIG. 3 also includes a memory coprocessor (e.g., a control access bus interface or CAB IF) coupled to the plurality of processors 304, the memory 302, and the external system memory 102. The memory coprocessor CAB IF can be configured to determine a status of the memory 302 and the external system memory 102.

Each of the plurality of processors 304 can be further configured to perform, in parallel to one another, QoS operations on the portion of the data in coordination with performing the security operations. As discussed above, the logic configured to perform QoS operations can include logic configured to identify an information flow associated with the portion of the data using DiffServ. Once a flow is identified, logic can be configured in the processors 304 to determine a priority of the information flow. Additional logic in the processors 304 can be configured to manage the transfer of data into and out of the memory 302 based on the priority of the information flow associated with the data. For example, portions of the data associated with a higher priority information flow can be retrieved from the memory 302 and operated on by the processors 304 before portions having a lower priority are operated on.

In addition, the operated-on portions of the data associated with a higher priority information flow can be transferred from the memory 302, e.g., to the external system memory 102 via the data coprocessor DS IF and bus 310, before transferring out of the memory 302 portions of the data associated with a lower priority flow. The system can include an enqueue coprocessor coupled to the plurality of processors 304 and to the data coprocessor DS IF. The enqueue coprocessor EnQ can be configured to manage the information flow associated with the data external to the system. For example, the enqueue coprocessor EnQ can interface with the scheduler 120 of FIG. 1 to schedule the transfer of data from the external system memory 102 to the network to maintain the information flow associated with the data.

A policy coprocessor Policy can be configured to assist the plurality of processors 304 in managing the transfer of the data into and out of the memory 302 by enforcing policies of the information flow associated with the data. Also, a counter coprocessor Counter can be configured to provide statistics related to the transfer of the data into and out of the memory and the enforcing of policies of the information flow.

According to an exemplary embodiment, each of the plurality of processors is configured to execute programmable instructions for performing the security operations on the portion of the data from a plurality of independent instruction streams (or threads). Each of the processors can switch between instruction steams in a single clock cycle. Switching can occur in one of the processors 304 when the processor 304 is waiting for a shared resource, e.g., the respective security processor 306 or the shared memory pool 302. Enabling the processors 304 to switch between independent instruction streams can allow the shared resources to remain optimally utilized. Each of the plurality of security processors 306 can include separate queues corresponding to each of the independent instruction streams of the processors 304.

The processors 304 can also include logic configured to compress the portion of the data using the processor prior to performing the security operations when the retrieved portion is non-secure data, and logic configured to decompress the portion of the data in the processor after performing the security operations when the retrieved portion is secure data. For example, the processor 106 can include pico-code to implement IPComp as discussed above. Each security processor can be configured to assist the respective processor 304 in compressing and decompressing the portion of the data. For example, the security processors 306 can include logic configured to implement at least one of the LZS and ALDC compression algorithms as discussed above.

Figure 5:
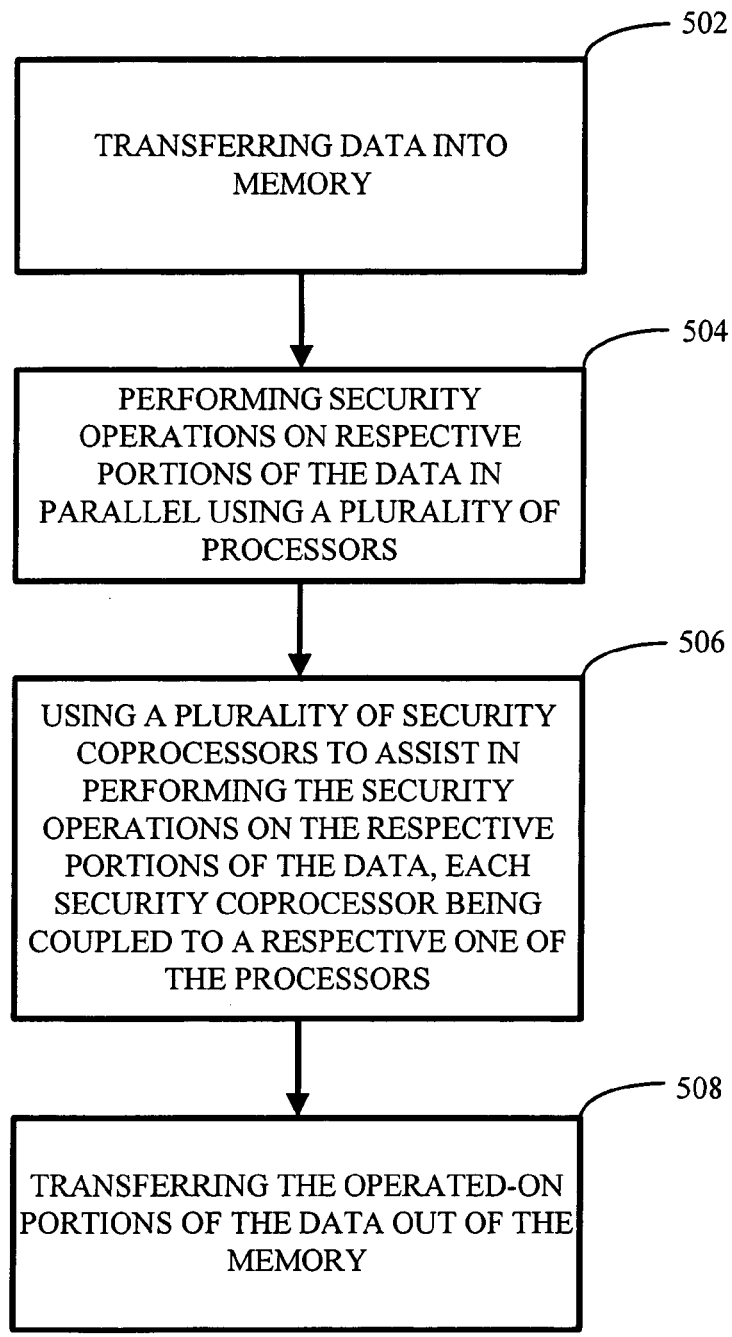
FIG. 5 is a flowchart illustrating a method for performing security operations on network data using the system of FIG. 3, according to an exemplary embodiment.

FIG. 5 is a flowchart illustrating a method for performing security operations on network data. The method can be carried out using an embedded processor complex such as that shown in FIG. 3. In block 502, data is transferred into memory, e.g., the shared memory pool 302 of FIG. 3. In block 504, security operations are performed on respective portions of the data in parallel using a plurality of processors, e.g., the protocol processors 304. The security operations can include IPSec authentication, data integrity, confidentiality (or encryption), and anti-replay protection, as described above in conjunction with the arrangements of FIGS. 1 and 3. In block 506, a plurality of security coprocessors, e.g., the crypto coprocessors 306, are used to assist in performing the security operations on the respective portions of the data. Each security coprocessor 306 is coupled to a respective one of the processors 304. Finally, in block 508, the operated-on portions of the data are transferred out of the memory 302.

According to an exemplary embodiment, the security operations performed by each of the processors 304 can include identifying an SA related to a portion of the data; filtering the portion of the data based on the identified SA; dividing the portion of the data into fragments; reassembling the fragments into the portion of data; and identifying a sequence associated with the portion of the data. For example, an IPSec process for performing security operations using the system of FIG. 3 is illustrated in FIG. 4.

According to another exemplary embodiment, the security operations assisted by each of the security coprocessors 306 can include obscuring a portion of the data when the portion is non-secure data; deciphering the portion of the data when the portion is secure data; determining an integrity of the portion of the data; and establishing an SA related to the portion of the data, wherein the security association includes information used in obscuring and deciphering the portion and in determining the integrity of the portion. Algorithms for encryption and authentication for use with IPSec are discussed above, and are described below in detail in conjunction with the cryptographic processor shown in FIG. 6. Control information can be exchanged between at least one of the memory 302 and external system memory 102 and each of the plurality of processors 304 for use in performing security operations on the data.

In another exemplary embodiment, QoS operations are performed on the respective portions of the data in parallel using the plurality of processors 304 in coordination with performing the security operations. The QoS operations performed by each of the processors 304 can include identifying an information flow associated with the data; determining a priority of the information flow; and managing the transfer of data into and out of the memory 302 based on the priority of the information flow associated with the data.

In related embodiments, the information flow can be managed after transferring the operated-on portions of the data associated with the information flow out of the memory 302, e.g., by using the enqueue coprocessor EnQ of FIG. 3 to interface with the scheduler 120 of FIG. 1. Policies of the information flow associated with the data can be enforced, e.g., using the policy coprocessor Policy of FIG. 3. In addition, statistics related to the transfer of the data into and out of the memory 302 and the enforcing of policies of the information flow can be provided, e.g., via the counter coprocessor Counter of FIG. 3.

Respective portions of the data can be compressed prior to performing the security operations when the portions are non-secure data, and decompressing after performing the security operations when the portions are secure data. For example, pico-code for implementing the IPComp protocol can be included in each of the processors 304 to perform the compression/decompression of the data. In addition, each security processor can be used to assist the respective processor in compressing and decompressing the portions of the data, e.g., via logic configured to implement at least one of the LZS and ALDC compression algorithms on IPComp-compliant datagrams.

The instructions of a computer program as illustrated in FIG. 5 for performing security operations on network data can be embodied in any computer readable medium for use by or in connection with an instruction execution system, apparatus, or device, such as a computer based system, processor containing system, or other system that can fetch the instructions from the instruction execution system, apparatus, or device and execute the instructions.

Figure 6:
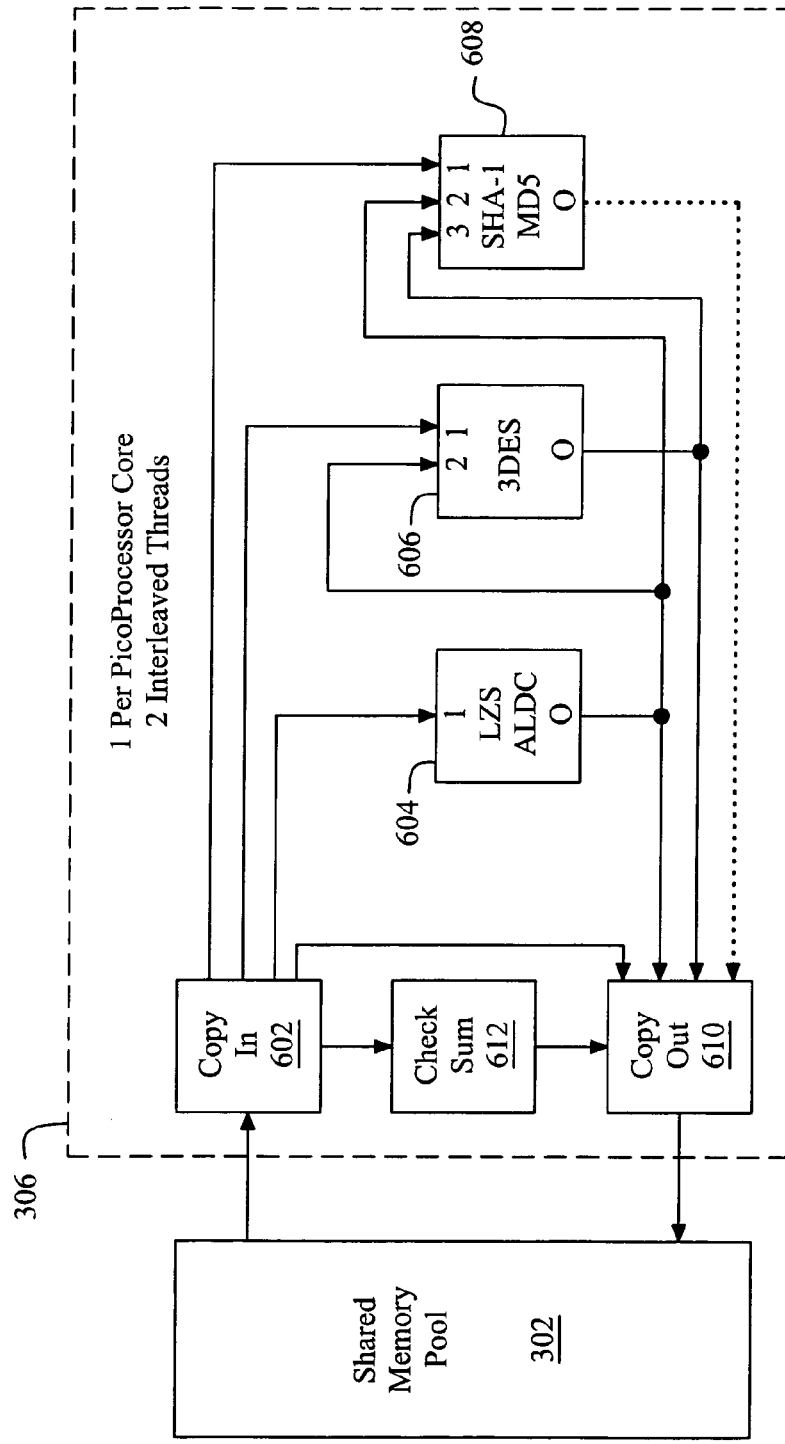
FIG. 6 illustrates a system for performing cryptographic operations on network data, according to an exemplary embodiment.

A system for performing cryptographic operations on network data according to an exemplary embodiment is shown in FIG. 6. The system shown in FIG. 6 corresponds to one of the cryptographic processors 306 shown in FIG. 3. The system includes an input interface 602 configured to receive data into the system, e.g., from the shared memory pool 302 shown in FIG. 3. A plurality of processors 604, 606, 608 are included in a cascaded arrangement. The cascaded arrangement can be a sequential arrangement in which the output of one processor is coupled to the input of at least one other processor in the arrangement.

As shown in FIG. 6, each processor 604, 606, 608 in the arrangement has an input 1 coupled to the input interface 602, and an output O coupled to respective inputs of each of the other processors downstream in the arrangement. The processors 604, 606, 608 are each configured to perform respective cryptographic operations, e.g., compression, encryption, authentication, and the like, on the data. An output interface 610 is coupled to the input interface 602, and to the output O of each of the processors 604, 606, 608. The output interface 610 is configured to transmit data out of the system, e.g., to the shared memory pool 302, and to direct the data through the system in coordination with the input interface 602 according to a predetermined algorithm. As used here, "downstream" refers to a progression of the processors 604, 606, 608 from the input interface 602 to the output interface 610. The system can include logic configured to determine a checksum associated with the data transmitted out of the system.

According to an exemplary embodiment, a first processor 604 has its data inputs 1 coupled only to the input interface 602. Consequently, the processor 604 is the first processor in the cascaded arrangement. The first processor 604 can be configured to compress uncompressed data and to decompress compressed data. For example, in FIG. 6, the first processor 604 is configured to perform at least one of the LZS and ALDC compression algorithms on the data. The data to be operated on can be, but need not be, compliant with the IPComp compression protocol.

A second processor 606 in the arrangement has a first input 1 coupled to the input interface 602 and a second input 2 coupled to an output 0 of the first processor 604. The second processor 606 can be configured to obscure non-secure data and to decipher secure data. For example, the second processor can be configured to obscure and decipher the data using at least one of the DES, 3DES, and AES algorithms. DES is defined by the National Institute of Standards and Technology (NIST) in the Federal Information Processing Standards Publications (FIPS PUBS) 46-2. 3DES is defined in the American National Standard (ANS) working draft X9.52-1998. AES is defined in NIST FIPS PUBS 197. The second processor 606 can be configured to perform other encryption algorithms if necessary.

A third processor 608 in the arrangement has a first input 1\coupled to the input interface, a second input 2 coupled to an output O of the first processor 602, and a third input 3 coupled to an output O of the second processor 606. The third processor 608 is configured to determine an integrity of the data. For example, the third processor can be configured to determine the integrity by hashing the data according to at least one of a SHA-1 and an MD5 algorithm. Hashing takes an input message (or data) of arbitrary length and produces a fixed length digest (or MAC) that is unique for the given message. SHA-1 (or HMAC-SHA-1-96) is defined in NIST FIPS PUBS 180-1. MD5 (or HMAC-MD5-96) is defined in IETF publication RFC 1321.

Consider an example in which the predetermined algorithm requires that both compression and encryption and/or authentication be performed on a data flow. Recall that IPComp/LZS/ALDC compression must be performed prior to performing security operations on the data when the data is non-secure and that decompression must occur after performing the security operations when the data is secure. If the data in the flow is non-secure data, the data can be directed from the input interface 602 to the first processor 604 where the data is compressed. Next, the compressed data can be directed to the second processor 606 for encryption and/or to the third processor 608 for computation of a MAC. The operated-on data and computed MAC can be directed to the output interface 610, which can then be transferred to the shared memory pool 302 for further processing or storage.

If, instead, the data in the flow is secure data, the data can be directed from the input interface 602 to the second processor 606 for decryption and/or to the third processor 608 for computation of a MAC. The operated-on data and computed MAC can then be directed to the output interface 610, which can then be transferred to the shared memory pool 302 for further processing or storage. The input interface 602 can then retrieve the operated-on data from the shared memory pool 302 and direct the data to the first processor 604 where it is decompressed. The decompressed data can be directed to the output interface 610 for transfer back to the shared memory pool 302.

According to an exemplary embodiment, the predetermined algorithm can be based on control information included in an SA related to the data. The input interface 602 can be configured to receive the control information and to forward the control information to each of the processors 604, 606, 608 for use in performing the respective cryptographic operations on the data. The control information can be gathered from an SA database (or SAD) by one of the processors 304 and stored in the shared memory pool 302 for use by the corresponding cryptographic processor 306.

The control information can include at least one of an identity of an authentication algorithm used to hash the data, e.g., SHA-1 or MD5; an identity of an encryption algorithm used to obscure and decipher the data, e.g., DES or 3DES; keying material used by at least one of the authentication and encryption algorithms, e.g., cryptographic keys generated by the Public Key Engine 414; and a lifetime of the SA related to the data. A IPSec mode, e.g., tunnel or transport, can also be included in the control information.

Figure 7:
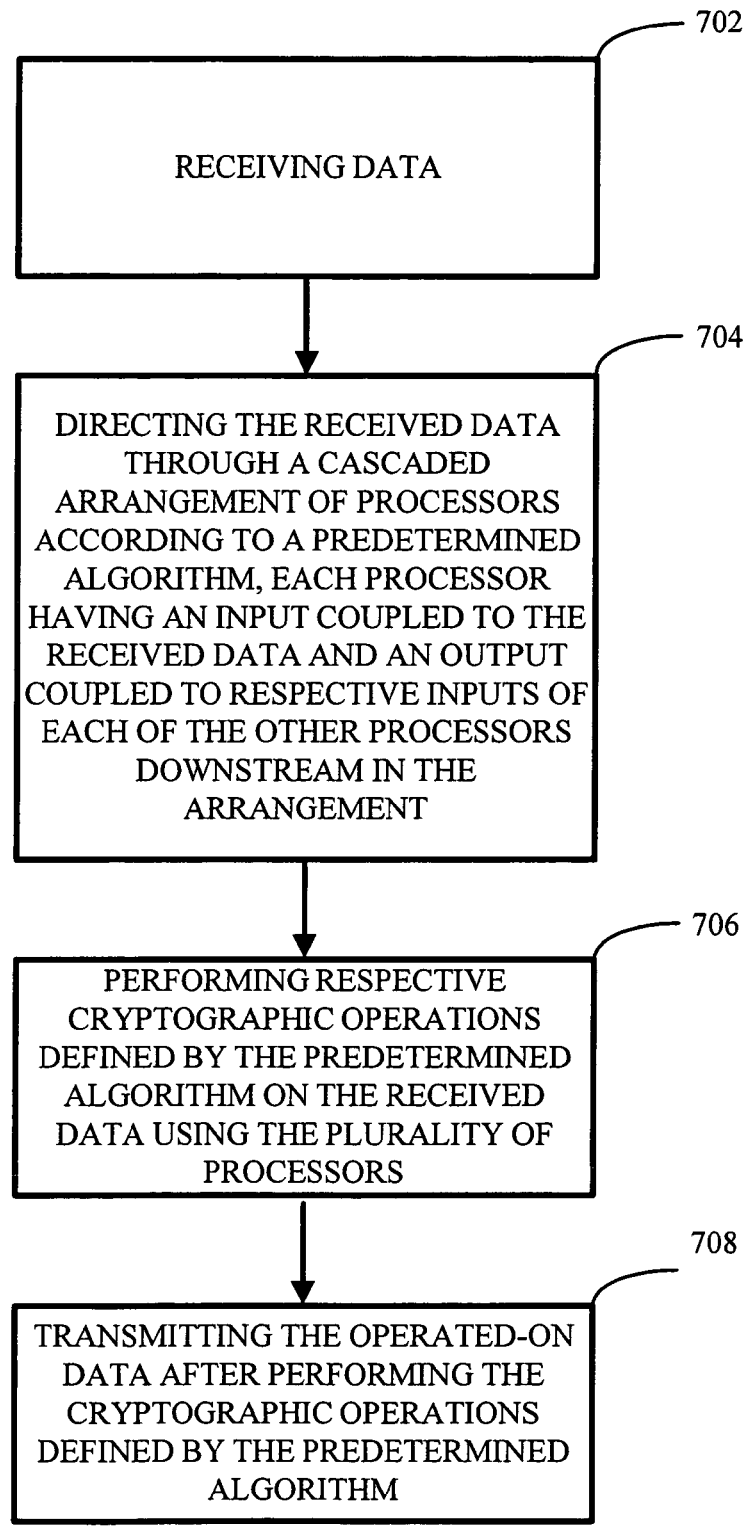
FIG. 7 is a flowchart illustrating a method for performing cryptographic operations on network data using the system of FIG. 6, according to an exemplary embodiment.

FIG. 7 is a flowchart illustrating a method for performing cryptographic operations on network data. The method can be carried out using cryptographic processor such as that shown in FIG. 6. In block 702, data is received, e.g., by the input interface 602 from the shared memory pool 302. In block 704, the received data is directed through a cascaded arrangement of processors, e.g., processors 604, 606, 608, according to a predetermined algorithm. Each processor 604, 606, 608 has an input 1 coupled to the received data and an output coupled to respective inputs of each of the other processors downstream in the arrangement.

In block 706 of the method, respective cryptographic operations defined by the predetermined algorithm are performed on the received data using the plurality of processors

604, 606, 608. The operated-on data is then transmitted in block 708 after performing the cryptographic operations defined by the predetermined algorithm. A checksum associated with the transmitted data can be determined. The checksum can be a 16-bit one's compliment checksum, such as a TCP/IP checksum.

According to an exemplary embodiment, uncompressed received data can be compressed and compressed received data can be decompressed using a first processor 604 in the arrangement having its data inputs 1 coupled only to the received data. The received data can be compressed and decompressed according to at least one of the LZS and ALDC compression algorithms as described above. The method can also include obscuring non-secure data and deciphering secure data using a second processor 606 in the arrangement having a first input 1 coupled to the received data and a second input 2 coupled to an output of the first processor 604. The data can be obscured and deciphered according to at least one of the DES, 3DES and AES algorithms.

An integrity of the data can be determined using a third processor 608 in the arrangement having a first input 1 coupled to the received data, a second input 2 coupled to an output of the first processor 604, and a third input 3 coupled to an output of the second processor 606. The data can be hashed to determine the integrity according to at least one of a SHA-1 and an MD5 algorithm.

The predetermined algorithm can based on control information included in an SA related to the received data. The control information can be forwarded to each of the processors 604, 606, 608 for use in performing the respective cryptographic operations on the data. The control information can include at least one of an identity of an authentication algorithm used to hash the data; an identity of an encryption algorithm used to obscure and decipher the data; keying material used by at least one of the authentication and encryption algorithms; and a lifetime of the SA related to the data.

The instructions of a computer program as illustrated in FIG. 7 for performing cryptographic operations on network data can be embodied in any computer readable medium for use by or in connection with an instruction execution system, apparatus, or device, such as a computer based system, processor containing system, or other system that can fetch the instructions from the instruction execution system, apparatus, or device and execute the instructions.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A system, comprising:
a memory;
a memory controller that transfers data received from a network to the memory;
a network interface coupled to the memory controller, the network interface comprising:
a first data moving unit (DMU) that exchanges secure data with a first portion of the network;
a second DMU that exchanges non-secure data with a second portion of the network; and
an embedded processor complex coupled to the memory controller, the embedded processor complex comprising:
a first protocol processor in communication with a first crypto coprocessor and a shared memory; and
a second protocol processor in communication with a second crypto coprocessor and the shared memory;
wherein the first and the second crypto coprocessors each comprise a sequential cascaded plurality of processors, and each of the sequential cascaded plurality of processors comprise:
an input interface in communication with the shared memory and with inputs of first, second and third cascaded processors;
an output interface in communication with the shared memory and with outputs of the first, second and third cascaded processors; and
an output of the first cascaded processor coupled to an input of the second cascaded processor and to an input of the third cascaded processor, and an output of the second cascaded processor coupled to an input of the third cascaded processor; and
wherein the first and second protocol processors in parallel identify information flow of the data in the memory, identify a priority of the identified information flow, retrieve a portion of the data from the memory using the memory controller based on the identified priority, perform security operations on the retrieved portion of the data, store the operated-on portion of the data in the memory using the memory controller, queue data for transfer based on the identified priority and discard portions of data associated with a particular information flow based on the identified priority;
wherein the first cascaded processor in response to an input of uncompressed, non-secure data from the input interface, outputs compressed data to the second cascaded processor and to the third cascaded processor, the second cascaded processor encrypts the compressed data received from the first cascaded processor and outputs the encrypted compressed data to the shared memory via the output interface, and the third processor hashes the compressed data received from the first cascaded processor and outputs a fixed length digest of the compressed data to the shared memory via the output interface; and
wherein the second cascaded processor, in response to an input of secure data from the input interface, decrypts the secure data received from the input interface and outputs the decrypted data to the shared memory via the output interface, and the third processor hashes the secure data input from the input interface and outputs a fixed length digest of the secure data to the shared memory via the output interface; and
wherein the memory controller is further configured to transfer the operated-on portion of the data from the memory to the network, wherein portions of the data having higher priority information flow are retrieved before portions of the data having lower priority information flow based on the identified priority, wherein the priority of information flow is independent of an order in which the data is stored in the memory and any contentions for memory.

2. The system of claim 1, wherein the first and second DMUs directly communicate with the first and seconds portions of the network.

3. The system of claim 2, wherein the network interface comprises:
a first serializer/deserializer (SERDES) circuit coupled between the first DMU and the first network portion and a second SERDES coupled between the second DMU and the second network portion, each SERDES configured to convert serial data received from the respective network portions to a parallel format and to convert parallel data received from the respective DMUs to a serial format.

4. The system of claim 1, wherein the embedded processor complex further performs quality-of-service (QoS) operations on the data in coordination with performing the security operations.

5. The system of claim 4, wherein the embedded processor complex performs the QoS operations by:
identifying an information flow associated with the portion of the data;
determining a priority of the information flow; and
scheduling at least one of the retrieving the portion of the data and the transferring of the operated-on portion of the data from memory based on the priority of the information flow associated with the portion of the data.

6. The system of claim 1, wherein the memory includes a memory block having a plurality of memory banks; and
the memory controller references the plurality of memory banks in a sequence that minimizes a memory access time.

7. The system of claim 1, wherein the memory controller further:
includes a request to reference the memory into one of a group of read requests and a group of write requests; and
executes all requests included in one of the groups of read requests and write requests before executing a request included in the other group.

8. The system of claim 7, wherein the embedded processor complex:
includes error correction code with the data transferred to or stored in the memory; and
detects and corrects errors in the data retrieved or transferred from the memory based on the error correction code included with the data.

9. A method for secure data transfer over a network, the method comprising:
transferring data from the network to memory using a memory controller;
identifying information flow of the data in the memory;
identifying a priority of the identified information flow;
retrieving a portion of the data from the memory based on the identified priority into an embedded processor complex using the memory controller, wherein portions of the data having higher priority information flow are retrieved before portions of the data having lower priority information flow, wherein the priority of information flow is independent of an order in which the data is stored in the memory and any memory contentions;
the embedded processor complex performing security operations on the retrieved portion of the data via a sequential cascaded plurality of processors, wherein an input interface is in communication with a shared memory and with inputs of a first, a second and a third cascaded processor; an output interface is in communication with the shared memory and with outputs of the first, second and third cascaded processors; and an output of the first cascaded processor is coupled to an input of the second cascaded processor and to an input of the third cascaded processor, and an output of the second cascaded processor is coupled to an input of the third cascaded processor, by:
in response to an input of uncompressed, non-secure data, the first cascaded processor outputting compressed data to the second cascaded processor and to the third cascaded processor, the second cascaded processor encrypting the compressed data received from the first cascaded processor and outputting the encrypted compressed data to the shared memory via the output interface, and the third processor hashing the compressed data received from the first cascaded processor and outputting a fixed length digest of the compressed data to the shared memory via the output interface; and
in response to an input of secure data, the second cascaded processor decrypting the secure data and outputting the decrypted data to the shared memory via the output interface, and the third processor hashing the secure data input and outputting a fixed length digest of the secure data to the shared memory via the output interface;
storing the operated-on portion of the data in the memory using the memory controller;
discarding portions of data associated with particular information flow based on the identified memory;
queuing the operated-on portion of the data for transfer based on the identified priority; and
transferring the operated-on portion of the data from the memory to the network using the memory controller.

10. The method of claim 9, comprising:
performing quality-of-service (QoS) operations on the data in coordination with performing the security operations.

11. The method of claim 10, wherein the QoS operations comprise:
identifying an information flow associated with the portion of the data;
determining a priority of the information flow; and
scheduling at least one of the retrieving the portion of the data and the transferring the operated-on portion of the data from memory based on the priority of the information flow associated with the portion of the data.

12. The method of claim 11, comprising:
deciphering the portion of the data prior to the identifying of the information flow when the retrieved portion is secure data; and
obscuring the portion of the data after the identifying of the information flow when the retrieved portion is non-secure data.

13. The method of claim 9, comprising:
compressing the portion of the data prior to performing the security operations when the retrieved portion is non-secure data; and
decompressing the portion of the data after performing the security operations when the retrieved portion is secure data.

14. The method of claim 9, comprising:
including a request to reference the memory into one of a group of read requests and a group of write requests; and
executing all requests included in one of the groups of read requests and write requests before executing a request included in the other group.

15. The method of claim 14, wherein the executing all requests included in one of the groups of read requests and write requests occurs when a sum of the requests included in one of the groups corresponds to a predetermined amount of the memory.

16. The method of claim 9, comprising:
including error correction code with the data transferred to or stored in the memory; and
at least one of detecting and correcting errors in the data retrieved or transferred from the memory based on the error correction code included with the data.

17. The method of claim 9, comprising:
referencing portions of the memory in a sequence that minimizes a memory access time.

18. A computer readable storage medium, wherein the medium is not a signal, containing a computer program for secure data transfer over a network, wherein the computer program comprises executable instructions for:
transferring data from the network to memory using a memory controller;
identifying information flow of the data in the memory;
identifying a priority of the identified information flow;
retrieving a portion of the data from the memory into an embedded processor complex using the memory controller based on the identified priority;
performing security operations on the retrieved portion of the data using the processor; via a sequential cascaded plurality of processors, wherein an input interface is in communication with a shared memory and with inputs of a first, a second and a third cascaded processor; an output interface is in communication with the shared memory and with outputs of the first, second and third cascaded processors; and an output of the first cascaded processor is coupled to an input of the second cascaded processor and to an input of the third cascaded processor, and an output of the second cascaded processor is coupled to an input of the third cascaded processor, by:
in response to an input of uncompressed, non-secure data, the first cascaded processor outputting compressed data to the second cascaded processor and to the third cascaded processor, the second cascaded processor encrypting the compressed data received from the first cascaded processor and outputting the encrypted compressed data to the shared memory via the output interface, and the third processor hashing the compressed data received from the first cascaded processor and outputting a fixed length digest of the compressed data to the shared memory via the output interface; and
in response to an input of secure data, the second cascaded processor decrypting the secure data and outputting the decrypted data to the shared memory via the output interface, and the third processor hashing the secure data input and outputting a fixed length digest of the secure data to the shared memory via the output interface;
storing the operated-on portion of the data in the memory using the memory controller;
discarding portions of data associated with particular information flow based on the identified memory;
queuing the operated-on portion of the data for transfer based on the identified priority; and
transferring the operated-on portion of the data from the memory to the network using the memory controller, wherein operated-on portions of the data having higher priority information flow are transferred before portions of the data having lower priority information flow, wherein the priority does not depend on a location of the operated-on data in the memory and any memory contention.

19. The computer readable storage medium of claim 18, wherein the computer program comprises executable instructions for:
performing quality-of-service (QoS) operations on the data in coordination with performing the security operations.

20. The computer readable storage medium of claim 19, wherein the computer program comprises executable instructions for:
identifying an information flow associated with the portion of the data;
determining a priority of the information flow; and
scheduling at least one of the retrieving the portion of the data and the transferring the operated-on portion of the data from memory based on the priority of the information flow associated with the portion of the data.

21. The computer readable storage medium of claim 18, wherein the computer program comprises executable instructions for:
compressing the portion of the data prior to performing the security operations when the retrieved portion is non-secure data; and
decompressing the portion of the data after performing the security operations when the retrieved portion is secure data.

* * * * *